United States Patent [19]

Kratz

[11] Patent Number: 4,855,893

[45] Date of Patent: Aug. 8, 1989

[54] APPARATUS FOR THE LOW-LOSS WIRING OF THE SEMICONDUCTOR SWITCHING ELEMENTS OF A THREE-LEVEL INVERTER

[75] Inventor: Gerhard Kratz, Heroldsbach, Fed. Rep. of Germany

[73] Assignee: Siemens Aktiengesellschaft, Berlin and Munich, Fed. Rep. of Germany

[21] Appl. No.: 216,814

[22] Filed: Jul. 8, 1988

[30] Foreign Application Priority Data

Jul. 17, 1987 [DE] Fed. Rep. of Germany ....... 3723740

[51] Int. Cl.[4] .......................................... H02M 7/515
[52] U.S. Cl. ..................................... 363/136; 363/28; 363/58
[58] Field of Search ....................... 363/27, 28, 57, 58, 363/95, 96, 135, 136

[56] References Cited

U.S. PATENT DOCUMENTS 4,286,317  8/1981  Kommissari ........................ 363/136
4,386,396  5/1983  Angquist ............................. 363/136

FOREIGN PATENT DOCUMENTS 2237205   2/1973  Fed. Rep. of Germany ...... 363/135
3222621  12/1983  Fed. Rep. of Germany ........ 363/28
3345481   6/1984  Fed. Rep. of Germany ........ 363/58
3430308   2/1986  Fed. Rep. of Germany ...... 363/136
2245123   4/1975  France .
0247391   7/1970  U.S.S.R. ............................. 363/135
0399982   2/1974  U.S.S.R. ............................. 363/135
0758440   9/1980  U.S.S.R. ............................. 363/136

Primary Examiner—Patrick R. Salce
Assistant Examiner—Kristine Peckman
Attorney, Agent, or Firm—Kenyon & Kenyon

[57] ABSTRACT

Low-loss external wiring, for the switching-off relief of the semiconductor switching elements in a stage of a three-level inverter provides a switching-off relief capacitor which is connected to the stage output. Wiring capacitors are coupled to each of the upper and lower ends of the stage. The inverter also includes a diode network. Additional d-c consumers which are preferably either ohmic resistors or energy recovery devices take up energy which is interim-stored in the wiring capacitors.

10 Claims, 6 Drawing Sheets

APPARATUS FOR THE LOW-LOSS WIRING OF THE SEMICONDUCTOR SWITCHING ELEMENTS OF A THREE-LEVEL INVERTER

FIELD OF THE INVENTION

The present invention relates to apparatus for relieving the semiconductor switching elements of a stage of a three-level inverter of large voltage changes, especially during a disconnecting process.

BACKGROUND OF THE INVENTION

The power section of a three-level DC/AC converter (or "inverter") is known, for instance from the publication "A New Neutral-Point-Clamped PWM Inverter", in "IEEE Transactions on Industry Applications", Vol. IA-17, No. 5, September/October 1981, pages 518–521, and is shown in the first figure on page 518 of that publication.

One stage, i.e., that part of the inverter which provides one of the phase outputs of such a three-level inverter is also shown in the attached prior art FIG. 1. As shown in this prior art figure, the stage contains a series arrangement of four antiparallel circuits each having a semiconductor switching element and a bypass diode. As semiconductor switching elements, power MOS field-effect transistors or gate-turnoff thyristors ("GTO thyristors") are preferably used. If power field-effect transistors are used, the antiparallel bypass diode can be omitted because the inverse diode is frequently already provided internally to the component. In the stage shown in prior art FIG. 1, for instance, four GTO thyristors T11, T12, T21, T22 are used, across which the respective bypass diodes D11, D12, D21, D22 are shunted antiparallel. The first and second antiparallel circuit of T11, D11 and T12, D12 and the third and fourth antiparallel circuit of T21, D21 and T22, D22 represent the upper and lower parts respectively of the inverter stage shown.

The series arrangement of the four antiparallel circuits is fed via four connecting points from a d-c voltage source $U_D$. The ends of the series arrangement are connected via switching-on relief choke coils to the positive and negative potential points 1, 2 of the d-c voltage source. In the example of prior art FIG. 1, these first and second switching-on relief choke coils are designated by L1 and L2. The other two connecting points correspond to the junction point between the first and the second antiparallel circuit and the junction point between the third and the fourth antiparallel circuit. These connecting points are coupled via first and second coupling diodes D1 and D2 and an inductance L10 that also serves as a switching-on relief choke coil, to the junction point of voltage divider capacitors $C_{D1}$ and $C_{D2}$. These voltage divider capacitors $C_{D1}$, $C_{D2}$ are also supplied by the d-c voltage source $U_D$. The junction point between the second and the third antiparallel circuit serves as the output of the inverter stage, at which the stage voltage $U_{P1}$ shown in FIG. 1, can be taken off. The switching-on relief choke coils L1, L2 and L10 need not always be present in the form of discrete components, depending on the first circuit design, but can instead be formed by means of parasitic line inductances.

In the attached FIG. 2, the principle of an exemplary switching cycle of the semiconductor switching elements of the inverter stage of FIG. 1 is schematically shown for generating an approximately sinusoidal phase output voltage $U_{P1}$. In addition to a load connected to the phase output, load inductances that are present are utilized for smoothing the stage output voltages. For generating, for instance, a positive halfwave of the stage output voltage $U_{P1}$, the thyristor T11 is switched on and off in pulse-fashion for a certain time. This is followed by a region in which thyristor T11 remains switched on and the thyristor T12 is switched on and off in pulse fashion. Finally, thyristor T12 remains switched off and thyristor T11 is actuated again in pulse fashion. A similar switching cycle for generating a negative halfwave is shown for the thyristor T121 and T22.

The ratio between the on and off time for each pulse of one of the thyristors can be varied by the well-known method of pulse-width modulation in such a manner that the phase output voltage is further approximated to the desired sinusoidal form. For greater clarity, modulation-related changes in the ratio of the respective on and off times are not shown in FIG. 2. In pulsing the semiconductor components T11 and T21 and the components T12 and T22, with the elements T11 and T21 respectively switched on, switching takes place between null potential and one-half potential and half and full potential of the d-c voltage source $U_D$. This pulsing between three different potentials in the prior art three-level inverter makes possible an even more accurate approximation of the stage output voltage to the desired sinusoidal form than is the case in a known two-level inverter. There, switching takes place with pulse-width modulation only between null potential and the full potential of the feeding d-c voltage source.

In practice, the above-described pure power section of one stage of a three-level-inverter which contains in principle a series arrangement of four antiparallel circuits, two coupling diodes and switching-on relief chokes is incomplete to provide proper operation. Rather, it is advantageous to provide additional measures for switching-off relief especially for the semiconductor switching elements and their bypass diodes. For this reason, each of the antiparallel circuits in the example of FIG. 1, as well as each of the coupling diodes D1, D2, is provided with a known "RCD switching-off relief network".

It is also advantageous to isolate the semiconductor components and to remove the energy temporarily stored in the switching-on relief chokes L1, L2 and L10 during the switching-off process of the upper and lower part of an inverter stage. This purpose is served by two further additional RCD wiring networks of the elements C10, R10, D10 and C20, R20, D20. Each such network is between the junction point of the switching-on relief choke L1 or L2 and the respective end of the series arrangement and the junction point of the respective coupling diode D1 or D2 with the further switching-on relief choke L10.

A stage of the three-level-inverter wired with such RCD networks has the disadvantage that the cost of components required for the wiring is rather large and considerable losses occur in the wired circuits. The energies produced during the switching-off process of a semiconductor element are dissipated here in the ohmic resistance of the respective RCD network. The use of energy feedback circuits instead of the resistors in each of the RCD networks would further increase the cost of the components because each feedback circuit would have to feed back the energy from a different potential point into the d-c voltage source $U_D$.

For the stages of two-level-inverters, wiring arrangements that are optimized for efficiency which use a minimum of components are already known. Thus, a circuit is shown in German Published Unexamined Patent Application 32 44 623, which is constructed entirely without RCD wiring networks and which has a switching-off relief capacitor, a storage capacitor, two switching-off relief diodes and a d-c consumer per inverter stage. The small losses produced by this wiring are reduced further if a d-c transformer is used for feeding back the energy into the d-c voltage source instead of an ohmic resistor.

Thus there is a need to provide wiring that is optimized as to efficiency for the semiconductor components in the stage of a three-level inverter which uses a minimum of components.

SUMMARY OF THE INVENTION

This need is fulfilled with the present invention by providing an apparatus for relieving the semiconductor switching elements of one stage of a three-level inverter of the type described above of large voltage changes during a switching-off process. Thus, the inverter stage has a series arrangement of four antiparallel circuits, each containing a semiconductor switching element and a bypass diode. A junction point of the second and the third antiparallel circuit serves as a stage output. The inverter stage receives input from a d-c voltage source having positive and negative potentials to which ends of the series arrangement are coupled via first and second switching-on relief chokes. First and second coupling diodes couple junction points between the first and second and third and fourth antiparallel circuits and two voltage divider capacitors which are fed by the d-c voltage source. The relieving apparatus comprises third and fourth switching-on relief chokes for limiting the current rate of rise. These relief chokes are respectively coupled in series with the first and second coupling diode and to a junction point of the two voltage divider capacitors. The apparatus also comprises a switching-off relief capacitor having one terminal which is connected to the stage output, and first and second wiring capacitors included with one terminal of the first wiring capacitor being coupled to the positive potential, and one terminal of the second wiring capacitor being coupled to the end of the series arrangement that is coupled to the negative potential of the d-c voltage source. First and second d-c consumers couple the other terminals of the first and second wiring capacitors to the junction point of the two voltage divider capacitors.

Finally, the apparatus includes a diode network which has first and second wiring diodes which couple a fictitious center at the other terminal of the switching-off relief capacitor to a junction point between the first coupling diode and the third switching-off relief choke, and a junction point between the second coupling diode and the fourth switching-on relief choke. The diode network also includes third and fourth wiring diodes for coupling the fictitious center to a junction point between the first wiring capacitor and the first d-c consumer, and to a junction point between the second wiring capacitor and the second d-c consumer. Finally, the diode network has fifth and sixth wiring diodes which couple a junction point between the first wiring capacitor and the first d-c consumer to the junction point between the first and second antiparallel circuit, and the junction point between the second wiring capacitor and the second d-c consumer to the junction point between the third and fourth antiparallel circuit.

BRIEF DESCRIPTION OF THE DRAWINGS

FIGS. 5a to 5d schematically show transients occurring in a stage of a three-level inverter equipped with the wiring device according to the present invention when a semiconductor switching element is switched on;

DETAILED DESCRIPTION

Figure 1:
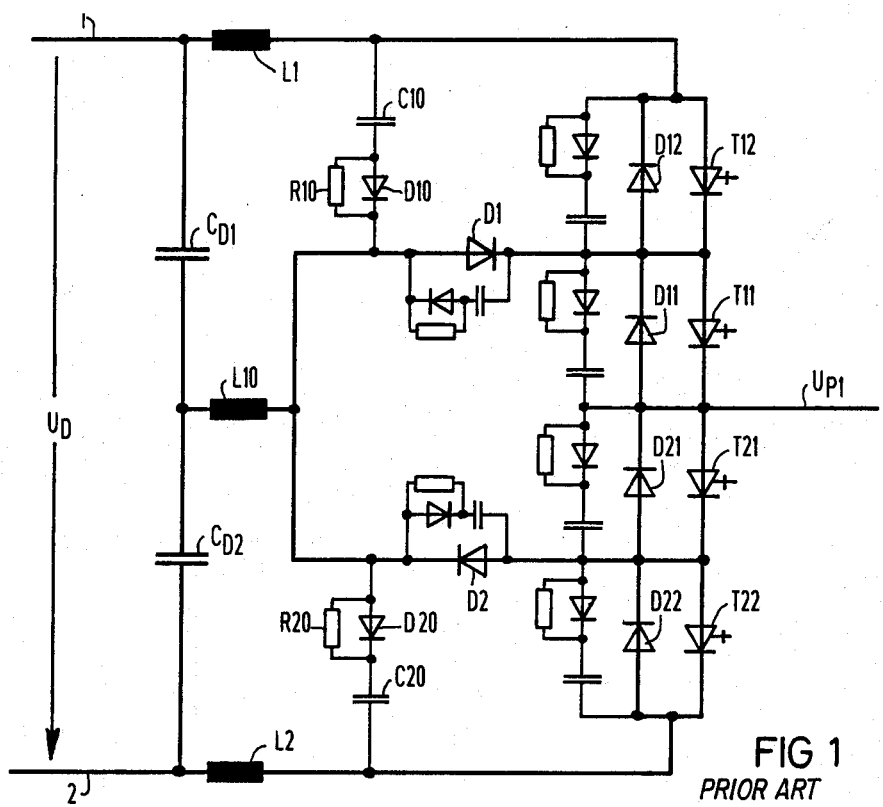
FIG. 1 shows one stage of a prior art three-level inverter which is wired with RCD switching-off relief networks.
Figure 2:
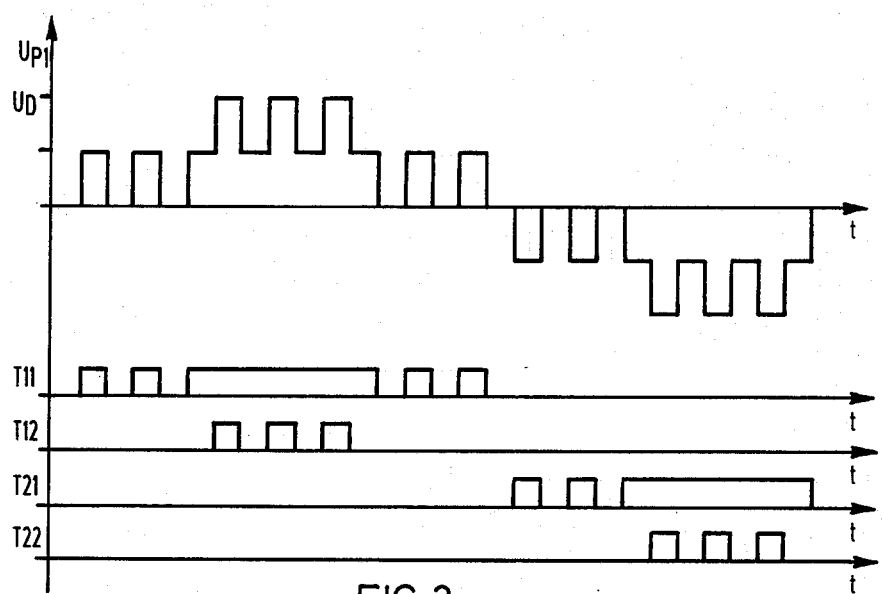
FIG. 2 shows schematically an exemplary switching cycle for the semiconductor switching elements of one stage of a three-level inverter.
Figure 3:
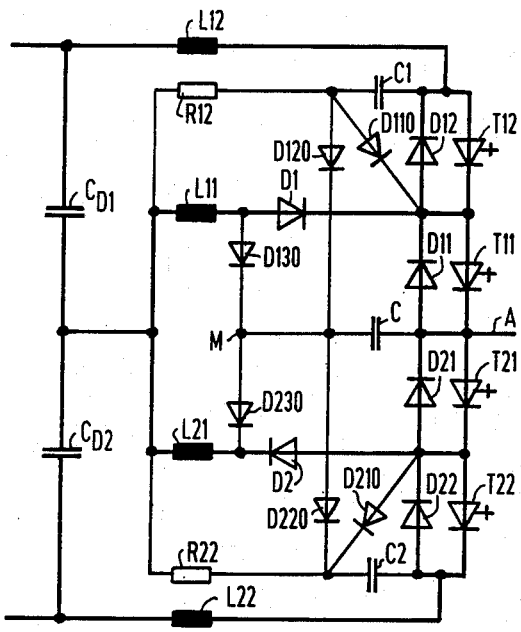
FIG. 3 shows a stage of a three-level inverter equipped with the wiring device constructed according to an embodiment of the present invention.

One advantageous embodiment of the device according to the present invention is shown in FIG. 3. In the invention, the switching-on relief choke L10, which in the circuit of FIG. 1 is connected at the junction point of the voltage divider capacitors $C_{D1}$ and $C_{D2}$, is divided into the two chokes L11 and L21. As the third and fourth switching-on relief chokes, these chokes L11 and L21 are each connected in series with a coupled diode D1 and D2. In the relief device according to the present invention, a switching-off relief capacitor C is connected to a terminal at the output A of the inverter stage between the third and fourth antiparallel circuits. When one of the semiconductor switching elements in the upper or lower part of the inverter stage is switched off, the rate of rise of the recurring voltage at the output of the respective semiconductor switching element is limited by the charging and discharging rate of the switching-off relief capacitor C. The charging process is made possible by the connection of the other terminal of the relief capacitor C to the junction point of the two voltage divider capacitors $C_{D1}$, $C_{D2}$ and to the positive or negative potential of the d-c voltage source.

In the embodiment of the invention according to FIG. 3, the connection to the voltage divider capacitors $C_{D1}$, $C_{D2}$ is accomplished via two wiring diodes D130 and D230 which are respectively connected at the junction point between the third switching-on relief choke L11 and the first coupling diode D1, and between the fourth switching-on relief choke L21 and the second coupling diode D2. The connection to the positive and negative potential of the d-c voltage source is accomplished through a series arrangement of a first wiring capacitor C1 and a third wiring diode D120 or through a second wiring capacitor C2 and a fourth wiring diode D220.

Due to these connections of the other terminal of the capacitor C, and because its capacity is chosen to be smaller by a factor of 10 to 20 as compared to the capacity of the wiring capacitors C1 and C2, the potential of this capacitor terminal deviates only slightly from one-half the voltage value of the d-c voltage source. This point of the circuit is therefore designated as the "fictional center M". The third and fourth switching-on relief chokes L11 and L21 serve for limiting the current rate of rise when one of the switching elements T11 and T21 is switched on, if the switching elements T12 and T22 carry no current. The first and second switching-on relief chokes L12 and L22 serve for limiting the current rate of rise when one of the switching elements T12 or T22 is switched on, if the switching element T11 or T21 carries current.

By means of two further wiring diodes which are designated in the illustrated embodiment of FIG. 3 by D110 for the upper diode and D210 for the lower diode, the switching-off relief capacitor C has a relief action for switching off the semiconductor switching element T11 or T12, depending on the actual operating state of the inverter stage. Further d-c consumers connected to each of the wiring capacitors C1 and C2 are realized in the embodiment of FIG. 3 in the form of ohmic resistances R12 and R22. These d-c consumers R12, R22 dissipate temporary overcharges in the wiring capacitors C1, C2.

It is an advantage of the wiring device of the invention that during the charge reversal of the switching-off relief capacitor C during switching on and off of one of the semiconductor switching elements, overcharging of this capacitor C is prevented. Therefore, the voltage stress of all the semiconductor switching elements is limited maximally to one-half the value of the d-c voltage source. This is achieved by the provision that the energy which is stored in the switching-on relief chokes L12, L22 and L11, L21 is taken up by the first or second wiring capacitors C1 and C2 which serve as the storage devices. This is needed because the switching-on relief chokes L12, L22 and L11, L21, upon interruption of the current flow, can no longer be used for the charge reversal of the switching-off relief capacitor C since the capacitor C is already charged to one-half the voltage value of the d-c voltage source. Via the resistors R12 and R22 which are connected to the junction point of the two voltage divider capacitors and serve as the d-c consumers, the overcharging is compensated so that in the time average, one-half the voltage value of the d-c voltage source is present also at the wiring capacitors C1 and C2. It is a particular advantage of the wiring device of the invention that these overcharge-related wiring energies produced as losses can be removed at a common potential point, contrary to the RCD-wired stage shown in FIG. 1. Also, the wiring device according to the present invention is further characterized by the feature of wiring losses that are considerably smaller than a stage wired with RCD relief networks, such as shown in prior art FIG. 1.

Depending on the final design of a three-level inverter equipped with the device according to the invention, and the parasitic inductances and capacities caused thereby, circulating currents can occur in a mesh which is formed by the third and fourth switching-on relief chokes L11, L21 and the first and second wiring diodes D130, D230. In a further embodiment, it is therefore especially advantageous to provide in this mesh means for suppressing the circulating currents. In this further embodiment, shown in FIG. 4, these means comprise third and fourth wiring capacitors C11 and C21 respectively arranged in series with the wiring diodes D130 and D230. Overcharging of these capacitors C11, C21 which might occur and is due to the energies contained in the switching-on relief chokes L11 and L21, can be removed here also by d-c consumers which are each connected to the junction point of the voltage divider capacitors $C_{D1}$, $C_{D2}$. In the embodiment illustrated in FIG. 4, the third and fourth d-c consumers are again realized as ohmic resistors R11 and R21.

Figure 4:
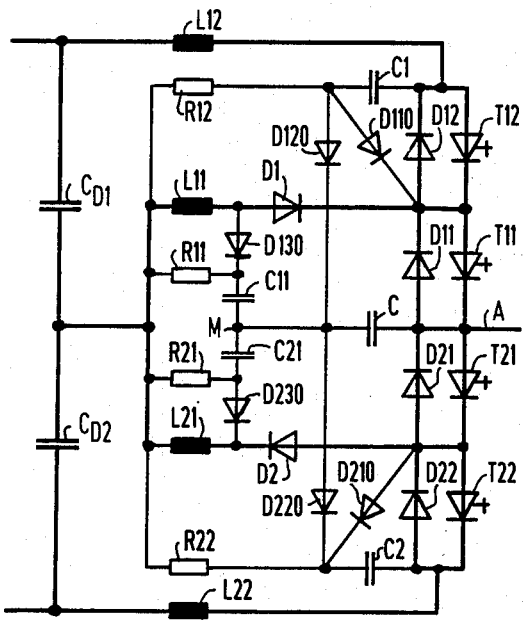
FIG. 4 shows a stage of a three-level inverter, equipped with a further embodiment of the wiring device according to the present invention, in which circulating currents are suppressed.
Figure 5A:
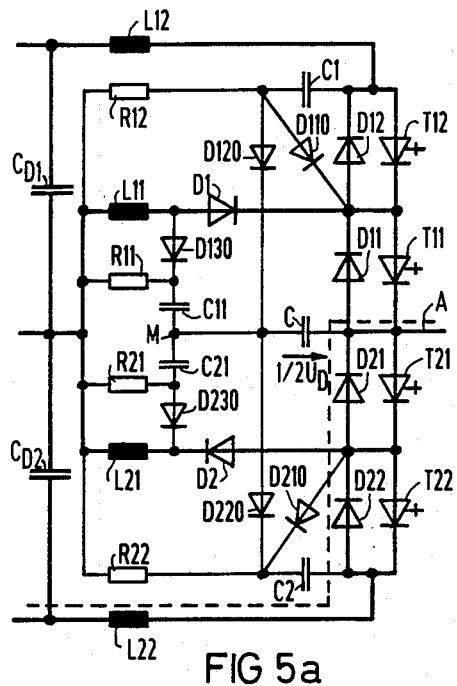

FIGS. 5a to 5d and 6a to 6d show examples of the current flow which occurs in the course of connecting and disconnecting the semiconductor switching elements T11 in the form of transients in the further embodiment of FIG. 4. In FIG. 5a, a starting state is shown in which all of the semiconductor switching elements are to be considered as disconnected and a current driven by the load flows via the bypass diodes D21, D22 of the lower stage half between the inverter output A and the negative potential of the d-c voltage source. (This is shown in dashed lines.) The switching-off relief capacitor C is assumed to be charged to one-half the voltage value of the d-c voltage source.

Figure 5B:
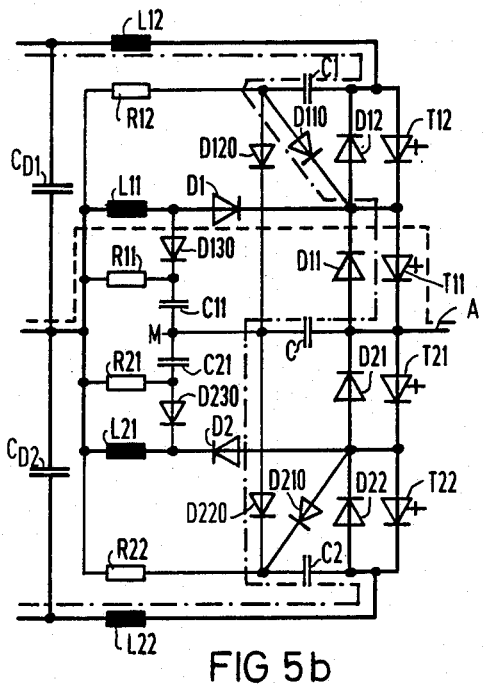
Figure 5C:
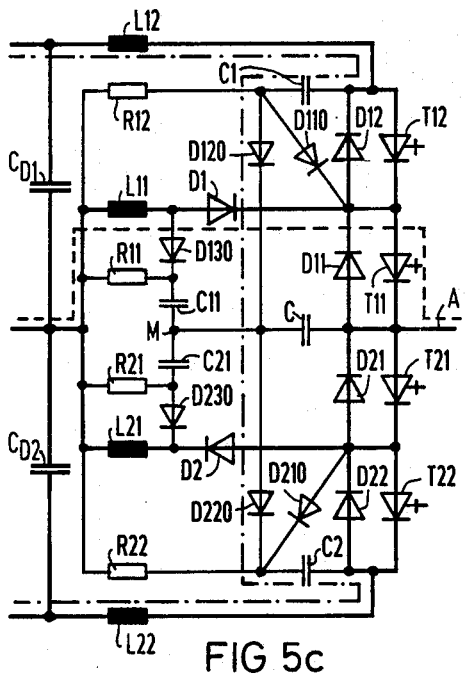
Figure 5D:
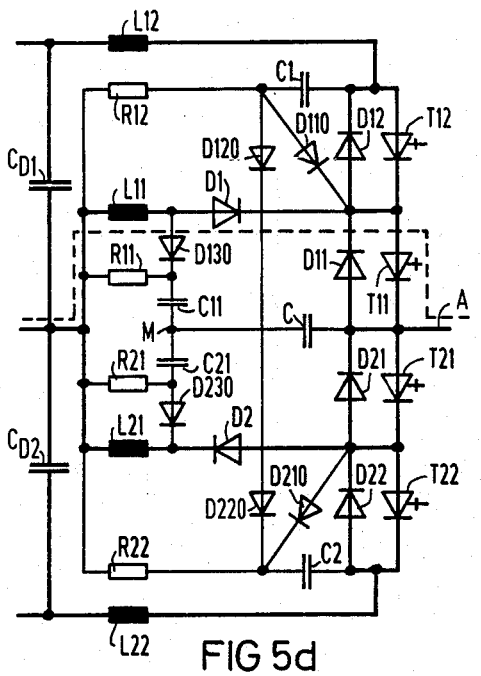

If the semiconductor switching element T11 now receives an "on" command, when the conductance of T11 starts, the current is commutated from the bypass diodes to the current path which leads via the first coupling diode D1. This current path connects the junction point of the voltage divider capacitors $C_{D1}$, $C_{D2}$ to the inverter output A. This is shown in FIG. 5b. The switching-on relief choke L11 limits the rate of rise of this current flow. At the same time, a charge reversal current develops which is shown dash-dotted in FIG. 5b and discharges the switching-off relief capacitor C which was originally charged to one-half the voltage value of the d-c voltage source $U_D$. If the energy contained in the switching-on relief choke L22, which had carried current until then, is not yet completely dissipated, the charge reversal current takes the path shown dash-dotted in FIG. 5c via the two circuit capacitors C1, C2 and the wiring diodes D120, D220. Thereby, the wiring capacitors C1, C2 are temporarily overcharged. After the complete dissipation of the energy contained in the switching-on relief choke L22, the charge reversal current shown dash-dotted in FIG. 5c is extinguished. The overcharge of the wiring capacitors C1, C2 is compensated by the d-c consumers R12, R22. The stationary current flow between the junction point of the two voltage divider capacitors $C_{D1}$, $C_{D2}$ and the output of the inverter phase adjusts itself at full height as shown in FIG. 5d.

Figure 6A:
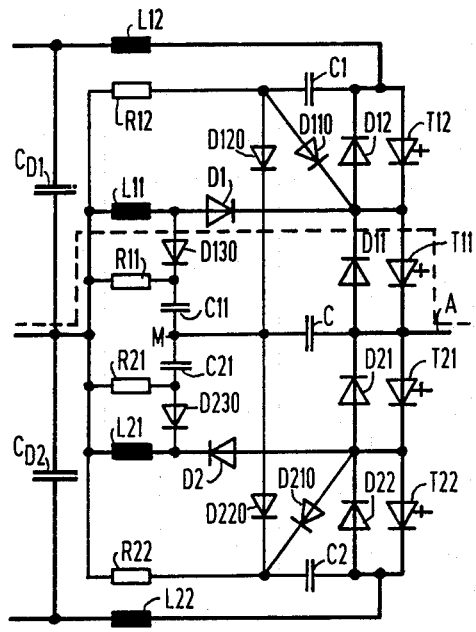
FIGS. 6a to 6d shows schematically the transients in a stage of a three-level inverter equipped with a wiring device constructed according to the present invention when a semiconductor switching element is turned off.
Figure 6B:
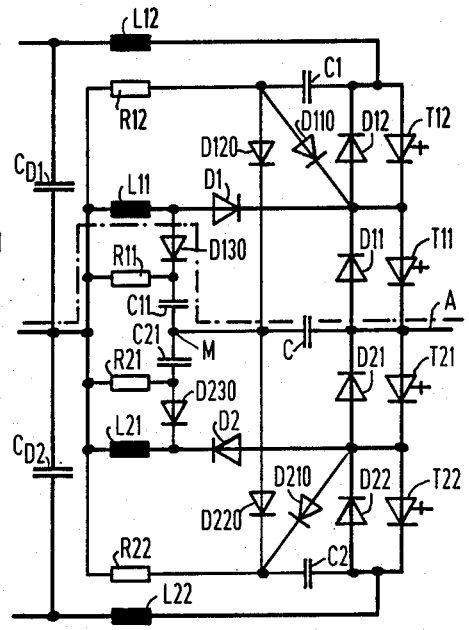

Due to the discharge of the capacitor C that took place by switching on the switching element T11 and due to the fact that therefore the voltage, if the circulation in the mesh formed by the elements C, D120, C1, T12 and T11 is zero, the switching-off relief device is now in a position to have a relief effect by limiting the rise of the recurring voltage in the event of a subsequent switching-off of the same switching element. The transients occurring then are shown schematically in FIGS. 6a to 6d. The starting state for the imminent switching off shown in FIG. 6a corresponds to the final state reached in FIG. 5d after a switching-on operation. As is shown in FIG. 6b, the current flow is commutated from the elements D1, T11 to the elements D130 and C after a switching-off command for T11 occurs. Thereby, the originally discharged switching-off relief capacitor C is charged up slowly, and the capacitor voltage building up in this manner is applied via the diode D1 as well as to the semiconductor switching element T11 which is to be relieved.

Figure 6C:
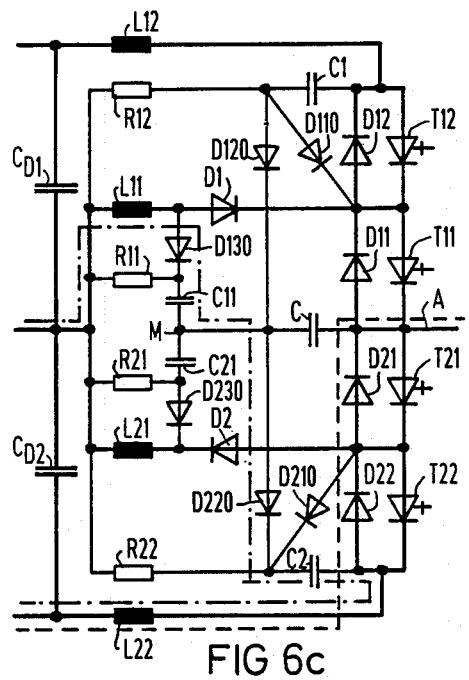
Figure 6D:
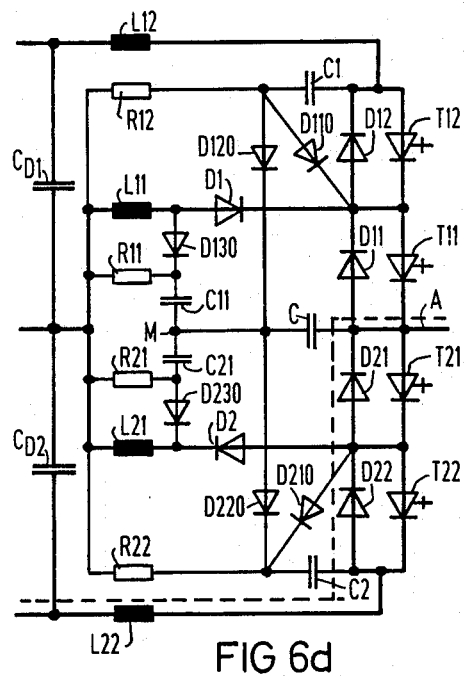

If the energy contained in the switching-on relief choke L11 is not dissipated completely after the switching-off relief capacitor C is completely charged to one-half the voltage value of $U_D$, the charge reversal current continues to flow through the wiring diode D220 and the wiring capacitor C2, as shown by the dash-dotted line in FIG. 6c. This leads to an overcharge of the capacitor C2, which is again compensated via the resistor R22 serving as a d-c consumer. With the decay of this charge reversal current, a current driven by the load inductance is increasingly built up via the bypass diodes D21, D22 so that finally the end state shown in FIG. 6d is reached, which is again identical with the original starting condition shown in FIG. 5a.

The charge reversal processes in the wiring according to the invention proceed similarly when the switching element T21 is connected or disconnected. Also here, the switching-off relief capacitor C charged initially to one-half the voltage value of the d-c voltage source is discharged as T21 is connected. The relief effect is then brought about, when T21 is switched off, by a renewed slow charging of C. If, on the other hand, the switching element T12 is additionally switched on, for instance, with T11 switched on, the capacitor which was originally discharged, is first charged with the reversed sign to one-half the voltage value of the d-c voltage source. Even so, the capacitor C can have a relieving effect if T12 is subsequently switched off since at the start of the switching-off process the wiring capacitor C1 is now charged to the same voltage value as the switching-off relief capacitor and therefore, the voltage in the mesh formed by the elements C, D120, C1, T12 and T11 is again zero. In the course of the switching-off process of T12, the capacitor C is discharged and thereby limits the rate of rise of the voltage recurring at the switching element T12. The switching-off relief capacitor C has now reached the charging state zero again so that it can have a relief effect also upon a subsequent additional disconnection of T11.

It is therefore an advantage of the invention that the switching-off relief capacitor C limits the voltage rise when any of the semiconductor switching elements in the stage of the three-level inverter is switched off. Therefore, for instance, no additional switching elements that need to be addressed need to be provided in the wiring itself which causes, for instance, a reversal of the effect of the relief device on the power section, for instance, of the upper or lower half of the stage.

In a further embodiment of the invention, it is advantageous if the d-c consumers are replaced by energy recovery devices, to which the wiring capacitors are connected via additional coupling diodes and which feed back their energy into the d-c voltage source $U_D$. In the embodiment according to FIG. 3, this corresponds to the d-c consumers R12, R22 of the capacitors C1, C2, and in the embodiment according to FIG. 4, to the d-c consumers R12, R11, R21, R22 of the capacitors C1, C2, C11, C21.

Figure 7:
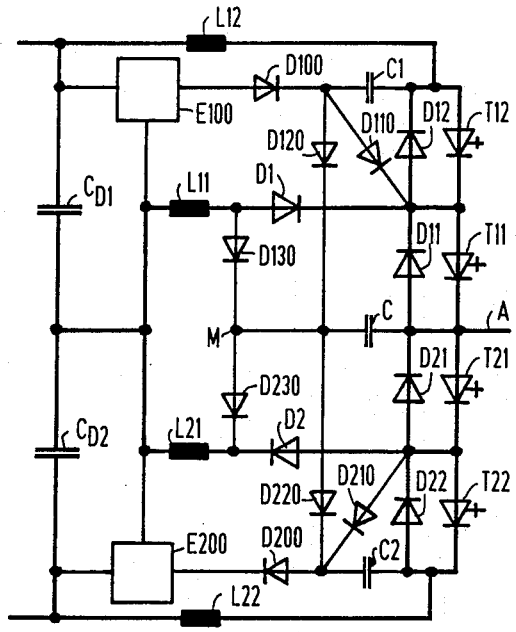
FIG. 7 shows a stage of a three-level inverter provided with the wiring device and additional energy recovery devices according to the present invention.
Figure 8:
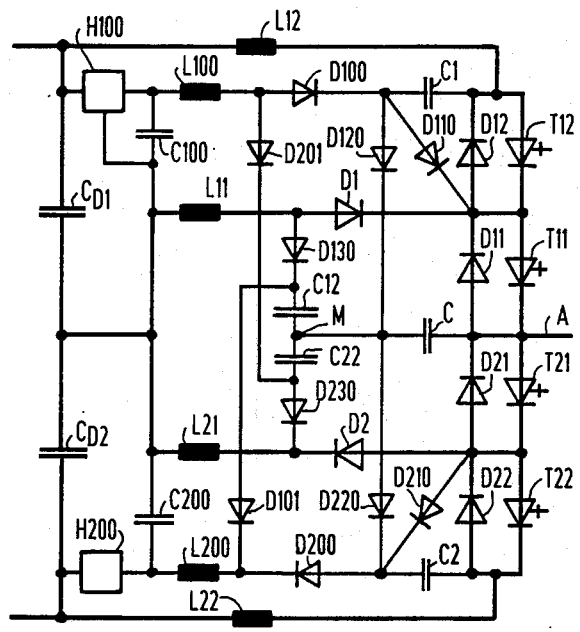
FIG. 8 shows a three-level inverter provided with a further embodiment of the wiring device according to the present invention, for suppressing circulating currents and having additional energy recovery devices.

In a further embodiment it is advantageous if, for each of the two halves of an inverter stage, only a single energy recovery device is provided to which all the wiring capacitors of the respective stage half are connected and which feed back the capacitor energy to the positive and negative potential of the d-c voltage source. Thus, FIGS. 7 and 8 show circuits of the wiring device according to the invention which are respectively equipped with the additional energy recovery devices E100, E200 and H100, H200 which correspond to the illustrated embodiments shown in FIGS. 3 and 4. In FIG. 7 the diodes D100, D200 serve as coupling diodes, while in FIG. 8, the coupling diodes are D100, D101, D200, D201. In addition, a particularly advantageous embodiment for the energy recovery devices is shown in detail in FIG. 8. It comprises two input circuits having series arrangement of an input choke L100 and L200, respectively, and input capacitors C100 and C200 which are connected between the corresponding coupling diodes and the junction point of the two voltage divider capacitors $C_{D1}$, $C_{D2}$. The input capacitors C100, C200 are shunted by voltage-up-setters H100 and H200 which feed back the capacitor energy to the positive or negative potential of the d-c voltage source $U_D$.

Figure 9:
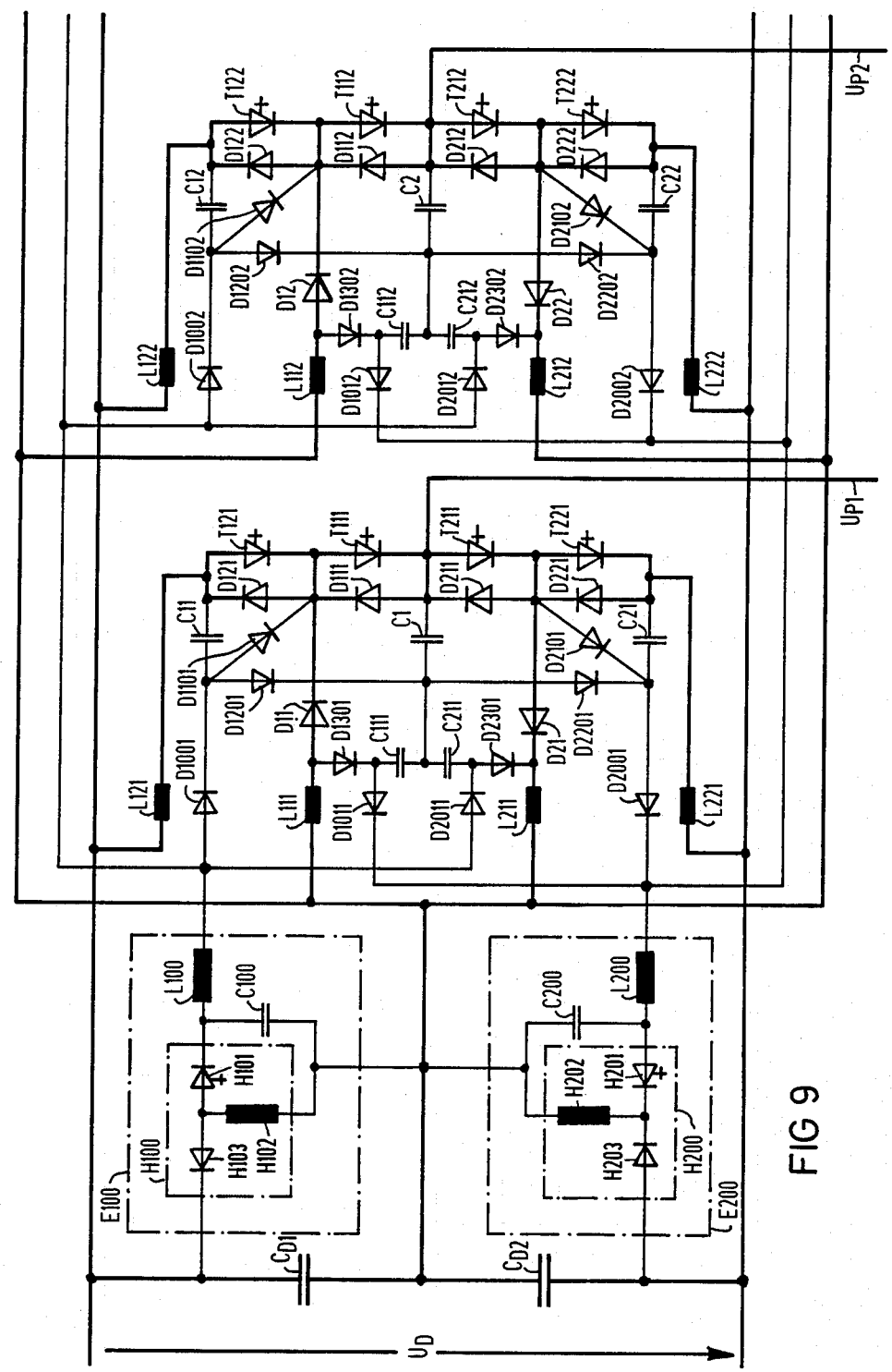
FIG. 9 shows several stages of a three-level inverter equipped with the further embodiment of the wiring device according to the present invention, for the suppression of circulating currents and having additional energy recovery devices.

An embodiment of the voltage-up-setter is again shown in the left part of the circuit shown in FIG. 9. The "up" setter contains series arrangements shunted across the respective input capacitors C100 and C200. Each series arrangement has a semiconductor switching element H101, H201 (preferably a GTO thyristor) and a storage inductance H102, H202. Additional diodes H103, H203, finally, represent the connection of the "up" setter to the positive or negative potential of the d-c voltage source. For recovering energy, the semiconductor switching element of the respective "up" setter is switched on briefly until the energy interim-stored in the input capacitor has been transferred to the storage choke. If thereafter the semiconductor switching element is cut off again, the storage inductance maintains the flow of current via the respective diode until the entire energy is fed back into the d-c voltage source.

As a rule, an inverter contains several stages to generate a multiphase, especially three-phase a-c system at its output. Each stage can be provided here with the wiring according to the invention as shown in the embodiments depicted in FIG. 3 or 4. If, according to the embodiments shown in FIGS. 7 and 8, energy recovery devices are used as d-c consumers for the energy of the wiring capacitors, it is advantageous in a further embodiment of the invention if only one energy feedback device connected to the positive potential and one connected to the negative potential of the d-c voltage source is provided for all inverter stages. In FIG. 9 such an arrangement is shown by the example of two inverter stages. Two of the four wiring capacitors of each stage are always connected jointly for all stages via corresponding coupling diodes at a single energy recovery device. Thus, for instance, the coupling diodes D1001, D2001 and D1002, D2002 connect the wiring capacitors C11, C22 and C12, C22 to the feedback device E100.

What is claimed is:

1. An apparatus for relieving semiconductor switching elements of one stage of a neutral-point-clamped PWM inverter of large voltage changes during a switching-off process, said inverter stage including a series arrangement of first, second, third and fourth antiparallel circuits each containing a semiconductor switching element and a bypass diode, a junction point between the second and the third antiparallel circuits serving as a stage output, the inverter stage receiving input from a d-c voltage source having positive and negative potentials via a first and second switching-on relief choke coil coupling the ends of the series arrangement to said d-c voltage source, two voltage divider capacitors coupled in series across the d-c voltage source, and first and second coupling diodes coupling the junction point of said voltage divider capacitors to junction points between the first and second, and third and fourth antiparallel circuits, the relieving apparatus comprising:
  (a) third and fourth switching-on relief choke coils for limiting the current rate of rise, coupled in series respectively with the first and second coupling diodes coupling said first and second coupling diodes to said junction point of the two voltage divider capacitors,
  (b) a switching-off relief capacitor having one terminal connected to the stage output,
  (c) first and second wiring capacitors with one terminal of said first wiring capacitor being coupled to the end of the series arrangement which is coupled to the positive potential, and one terminal of said second wiring capacitor being coupled to the end of the series arrangement that is coupled to the negative potential of the d-c voltage source,
  (d) first and second d-c consumers which couple the other terminals of said first and second wiring capacitors to the junction point of the two voltage divider capacitors, and
  (e) a diode network having: first and second wiring diodes which couple a fictitious center at the other terminal of the switching-off relief capacitor respectively to a junction point between the first coupling diode and the third switching-off relief choke coil, and a junction point between the second coupling diode and the fourth switching-on relief choke coil; third and fourth wiring diodes coupling the fictitious center respectively to a junction point between the first wiring capacitor and the first d-c consumer, and to a junction point between the second wiring capacitor and the second d-c consumer; and fifth and sixth wiring diodes which respectively couple the junction point between the first wiring capacitor and the first d-c consumer to the junction point between the first and second antiparallel circuit; and the junction point between the second wiring capacitor and the second d-c consumer to the junction point between the third and fourth antiparallel circuit.

2. An apparatus according to claim 1, further comprising means for suppressing circulating currents in a circuit formed by the third and fourth relief choke coils and the first and second wiring diodes.

3. An apparatus according to claim 2, further comprising:
  (a) third and fourth wiring capacitors which are respectively coupled in series with the first and second wiring diodes, and
  (b) a third d-c consumer which couples a junction point between the first wiring diode and the third wiring capacitor to the junction point of the two voltage divider capacitors, and a fourth d-c consumer which couples the junction point between the second wiring diode and the fourth wiring capacitor to the junction point of the two voltage divider capacitors.

4. An apparatus according to claim 3, wherein said first, second, third and fourth d-c consumers are ohmic resistors.

5. An apparatus according to claim 3, wherein said d-c consumers are energy recovery devices coupled to the d-c voltage source, and further including coupling diodes coupling said energy recovery devices to the wiring capacitors.

6. An apparatus according to claim 5, wherein one energy recovery device is coupled to the positive potential and another energy recovery device is coupled to the negative potential of the d-c voltage source.

7. An apparatus according to claim 6, wherein said energy recovery devices further comprise input wiring having first series arrangements of an input choke coil and an input capacitor, said input choke coil coupled to the coupling diodes and said input capacitors coupled to the junction point of the voltage divider capacitors, and voltage-up-setters shunting the input capacitors, said voltage-up-setters also being respectively coupled to the positive and negative potentials of the d-c voltage source.

8. An apparatus according to claim 7, wherein said voltage-up-setters include a second series arrangement, said second series arrangement including a semiconductor switching element and a storage inductance, and further including a diode coupling the junction point between the semiconductor switching element and the storage inductance respectively to the positive and negative potentials of the d-c voltage source.

9. An apparatus according to claim 8, wherein said apparatus has at least one further stage and further including additional coupling diodes coupling the wiring capacitors of the at least one further stage of the neutral-point-clamped PWM inverter to the energy recovery devices that are respectively coupled to the positive and negative potentials of the d-c voltage source.

10. An apparatus according claim 9, wherein said semiconductor switching elements are thyristors which have the capability of being turned off.

* * * * *